United States Patent
De Schrijver

(10) Patent No.: US 9,080,022 B2
(45) Date of Patent: Jul. 14, 2015

(54) ACRYLATE TERMINATED URETHANE AND POLYESTER OLIGOMERS

(75) Inventor: Aster De Schrijver, Deurle (BE)

(73) Assignee: GREENSEAL CHEMNICALS NV (BE)

( * ) Notice: Subject to any disclaimer, the term of this patent is extended or adjusted under 35 U.S.C. 154(b) by 153 days.

(21) Appl. No.: 13/260,603

(22) PCT Filed: Mar. 23, 2010

(86) PCT No.: PCT/EP2010/053778
§ 371 (c)(1),
(2), (4) Date: Nov. 8, 2011

(87) PCT Pub. No.: WO2010/108920
PCT Pub. Date: Sep. 30, 2010

(65) Prior Publication Data
US 2012/0135172 A1    May 31, 2012

(30) Foreign Application Priority Data
Mar. 27, 2009 (EP) .................................. 09156409

(51) Int. Cl.
*C08J 9/35* (2006.01)
*C08J 9/00* (2006.01)

(52) U.S. Cl.
CPC ............ *C08J 9/0061* (2013.01); *C08J 2367/06* (2013.01); *C08J 2375/04* (2013.01); *C08J 2433/00* (2013.01); *Y10T 428/1376* (2015.01)

(58) Field of Classification Search
CPC .. C08J 9/0061; C08J 2433/00; C08J 2375/04; C08J 2367/06; Y10T 428/1376
USPC .................................. 428/36.5, 35.7; 426/116
See application file for complete search history.

(56) References Cited

U.S. PATENT DOCUMENTS

| | | | | |
|---|---|---|---|---|
| 5,409,764 | A | * | 4/1995 | Otsuki et al. .................. 428/221 |
| 6,943,202 | B2 | * | 9/2005 | Zhu et al. ......................... 522/90 |
| 2002/0058721 | A1 | * | 5/2002 | Pachl et al. .................... 521/135 |

FOREIGN PATENT DOCUMENTS

EP    1798255 A1    6/2007

OTHER PUBLICATIONS

International Search Report for PCT/EP2010/053778, Completed by the European Patent Office on Apr. 20, 2011, 2 Pages.

* cited by examiner

*Primary Examiner* — Erik Kashnikow
(74) *Attorney, Agent, or Firm* — Brooks Kushman P.C.

(57) ABSTRACT

A pressurized can containing a polymer foam composition for use in one component and two component foams, with the polymer foam composition having an unsaturated resin and an oligomeric acrylic resin, wherein the composition has a cure rate of maximum 3 hours.

12 Claims, 1 Drawing Sheet

Step 1. Preparation of isocyanate terminated prepolymers (R - mono-, bi-, tri- or poly-valent radical)

Step 2. Transferring the NCO-termination into acrylic-termination by the use of 2-HEA (2-Hydroxyethyl acrylate)

Step 1. Preparation of isocyanate terminated prepolymers
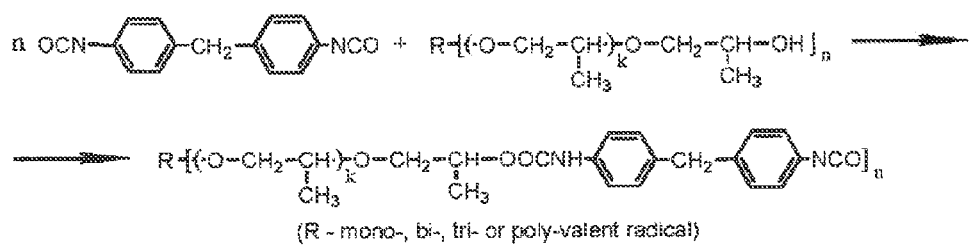
(R - mono-, bi-, tri- or poly-valent radical)
Step 2. Transferring the NCO-termination into acrylic-termination by the use of 2-HEA (2-Hydroxyethyl acrylate)
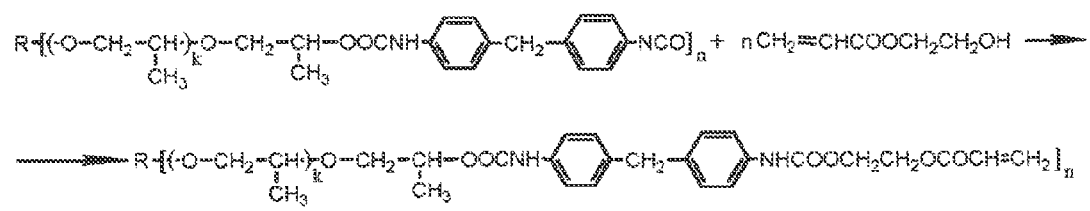

ACRYLATE TERMINATED URETHANE AND POLYESTER OLIGOMERS

CROSS-REFERENCE TO RELATED APPLICATION

This application is the U.S. national phase of PCT Appln. No. PCT/EP2010/053778 filed Mar. 23, 2010, which claims priority to European application 09156409.6 filed Mar. 27, 2009, the disclosures of which are incorporated in their entirety by reference herein.

FIELD OF THE INVENTION

The present invention relates to the polyurethane sprayable foam, in particular acrylate terminated urethane and polyester oligomer foams in aerosol cans and/or pressure vessels.

BACKGROUND OF THE INVENTION

Pressurized fluids stored in containers (cans or vessels) are used in a wide field of applications. Sprayable foams are used for several industrial applications as well as by hobbyists. One well known example of sprayable foam is polyurethane foam. Polyurethanes are, among others, used in high resiliency flexible foam seating, rigid foam insulation panels, microcellular sprayable foam seals and gaskets, durable elastomeric wheels and tires, electrical potting compounds, Spandex fibers, carpet underlay, hard plastic parts.

At present, existing sprayable foam formulations are one and two component PU foams (OCF=One Component Foams; TCF=Two Component Foams) in aerosol cans and/or pressure vessels. A PU foam formulation comprise of a mixture of polyols, diisocyanates, liquefied gases as blowing agents, and several additives. These foams provide excellent mechanical properties and outstanding thermal insulation. Therefore these are widely used in the construction field for thermal and sound insulation and fixation of door frames and others. These froths are cured by the reaction of the isocyanate terminated prepolymers with moisture.

In two component foams (TCF), both a polyol/additive/blowing agent and a NCO/additive/blowing agent mixture are made in separate cans. Both mixtures are blended upon spraying. In the OCF manufacturing process, at the first stage an aerosol can is filled of with a mixture of a polyol blend, isocyanate, different additives and physical blowing agent like Liquefied Petroleum Gases (LPG) and DME (Dimethyl-ether). The pre-polymerization reaction occurs inside the can: the polyol is reacted with isocyanate which is abundantly in excess present.

At the second stage, while dispensing, the liquid prepolymer leaves the can and starts to expand to a low density froth by vaporization of the physical blowing agent. Once exposed to the air, in the third stage, and in the presence of a chemical blowing agent (water), the reaction between water and the excess isocyanate will occur to form unstable carbamic acid which immediately decomposes into an amine and carbon dioxide, which will assure a second expansion of the foam.

A disadvantage of the above described process is that isocyanates are toxic. MDI, Methylene Diphenyl Diisocyanate, is the isocyanate most commonly used in the production of the PU foam. This compound, although the least hazardous of the isocyanate groups, is still toxic, harmful by inhalation or ingestion, and also via skin contact. In addition, the compound is flammable and can also be explosive.

The elaborate use of the pressurized fluids brings along some safety concerns. It is of utmost importance to use PU foams with a high froth or cure rate, so the foam is suitable for spray-on applications and for filling holes and cavities. The use of environmentally friendly blowing agents as well as non-harmful catalysts has become an important and urgent issue in the synthesis of PU foam. One Component Foams (OCF's) nowadays contain free monomeric crude MDI, which are critical with respect to toxicological and environmental implications. Isocyanates are even suspected of causing cancer and exposure to free, noncured isocyanates is dangerous. The present invention is a key resource to underpin these developments.

A proposed solution to avoid the toxic effect of isocyanates is the use of Alpha Silane terminated PU prepolymers (STP's). A well-known example is Soudafoam SMX® which is isocyanate-free fixing foam. Soudafoam SMX® is a moisture-curing system and performs best on moderately moistened porous surfaces. On non-porous surfaces, the best performance is achieved when the surface is dry and when the joint/cavity is shallow. In the case of a deeper joint/cavity it is better to fill the gap in two layers, with a drying/curing time in between.

Another example of the incorporation of silane to avoid the toxic effect of isocyanate is presented in JP2000026648. JP'648 presents a process for preparing foams without using isocyanates and strongly acidic substances. A composition is proposed containing i) an organic compound having a carboncarbon double bond, ii) a compound having an SiH group and iii) a blowing agent and/or a compound having an OH group.

Although isocyanate-free, the use of PU foams based on Alpha Silane terminated PU prepolymers in aerosol cans has several drawbacks, such as high viscosity, slow curing, some crack formation and a rather high cost.

EP1798255 discloses a process for preparing precursor mixtures of polymer foam to be packed in pressurized vessels and or aerosol cans. The polymer foam can be either a polyester foam, a foam based on cyclocarbonate oligomers and primary amine oligomers, or a foam based on acrylic oligomers. Biodiesel is included as latent hardener arid/or extender and/or liquid filler in polyurethane formulations, more particularly One Component Foams precursor mixtures. The improved formulation avoid long-term deterioration of flexibility and mechanical strength of the foam.

Given the above drawbacks of existing sprayable PU foams, it is a main object of the present invention to provide optimized PU foam with respect to production cost, high shelf-life, ease of handling and efficiency.

It is a particular object of the invention to provide sprayable foam that allows fast curing. The curing of the unsaturated polyester resin and the acrylates oligomers is performed via a free radical crosslinking mechanism. This makes the foams suitable for spray-on applications and for filling holes and cavities. Spraying of the foam is thus simple and user friendly. Further, by using fast curing PU foam, contact with free non-cured isocyanates is avoided.

It is a further object of the present invention to provide sprayable foam that is safe for human's health. Although MDI is the least hazardous of the isocyanate groups, it is still toxic and harmful by inhalation or ingestion, and also through skin contact. By combining the MDI with oligomers having reactive end groups, the toxic isocyanates groups are shielded and health safety is guaranteed.

It is also an object of the present invention to provide a sprayable foam that is environmentally friendly without loss of overall characteristics of the foam. The use of environmentally friendly blowing agents as well as non-harmful catalysts has become an important and urgent issue in the synthesis of PU foam. By shielding the toxic isocyanates, the risk of release of toxic gases, especially upon catching fire or explosion, is reduced.

The present invention meets the above objects by using acrylated terminated urethane and polyester oligomer sprayable foam in accordance with the present invention.

SUMMARY OF THE INVENTION

The present invention is directed to a pressurized can containing a polymer foam composition for use in one component and two component foams, said polymer foam composition comprising an unsaturated resin and an oligomeric acrylic resin, characterized in that the composition has a cure rate of maximum 3 hours.

DESCRIPTION OF THE INVENTION

The present invention is directed to a pressurized can containing a polymer foam composition for use in one component and two component foams, said polymer foam composition comprising an unsaturated resin and an oligomeric acrylic resin, characterized in that the composition has a cure rate of maximum 3 hours.

An optimal froth or cure rate for the PU foam results in a fast chemical curing and in a higher expansion ratio. This makes the foams suitable for spray-on applications and for filling holes and cavities. A high expansion ratio further results in a quick, consistent foam flow and fast curing time. Moreover, the curing kinetics of a combination of unsaturated polyesters and oligomers is much faster compared to the slow curing behavior (curing up to 24 hours) of PU foams produced without such oligomers. An optimal curing rate results in a wider range of possible applications of these newly designed foams. The cure rate is maximum 3 hours, preferably, it is maximum 1 hour and more preferably, the curing occurs within 30 minutes.

The present invention focuses on the creation of one and two component foams with unsaturated polyester resins and oligomeric reactive molecules as chemical backbone.

BRIEF DESCRIPTION OF THE DRAWINGS

FIG. 1 schematically represents the preparation of the oligomers, containing acrylic end groups.

DESCRIPTION OF A PREFERRED EMBODIMENT

According to the present invention, one and two component foams are presented having unsaturated polymer backbones doped with oligomers. Preferably, the backbone of the PU foam comprises an unsaturated polyester resin or an unsaturated urethane resin with di-, tri- and polyfunctional endcapped acrylates or (meth)acrylates. A main advantage of this kind of chemistry is that by incorporating in such unsaturated backbones with reactive groups and different functionalities, an oligomeric acrylic resin comprising di-, tri-, or polyfunctional endcapped acrylates or methacrylates, the generally toxic and harmful diisocyanates groups in the backbone of the prepolymer are blocked.

In a preferred embodiment, beside the unsaturated polyester urethane and the acrylates backbone and monomers, other additives are needed to control the froth and curing process. A range of rheology modifiers, plastisicers, flame retardants, intitiators, crosslinkers, blowing agents, surfactants, tackifiers and other additives are used in certain mixing ratios in order to complete ecological friendly, fast curing foams with suited mechanical characteristics.

Unsaturated polymers include polyesters like polyethylene terphtalate and polyethers like polyethylene glycol. According to the present invention, preferably unsaturated polyester is used for the PU backbone. Any polymer with a (poly)ester backbone and possessing some amount of double bonds may be utilized to some extend and is therefore included in the broad definition of an unsaturated polyester resin. Unsaturated polyesters (UP) or polyester resins are of the most important used polymers in the world due to their versatility, availability and low cost. UP resins are formed by the crosslinking of the double bonds present in the polyester prepolymers with vinylic monomers using specific initiators and catalysts. The polyester prepolymers are made alcohols and carboxylic acids. Di-, tri- to polyfunctional alcohols with a preferred molecular weight ranging from 50 to 1000 g/mol can be used. Low molecular weight glycols such as ethylene glycol or propylene glycol, are preferred. Both saturated and unsaturated di-, tri- to polyfunctional carboxylic acids with molecular weight ranging between 50 and 1000 g/mol, with dicarboxylic acids possessing 4 to 8 carbon atoms such as adipic acid, maleic acid and fumaric, or anhydrides such as phtalic anhydride are preferred. These systems are sold as commercial products together with suited vinylic monomers possessing a functionality of preferably at least two, with each double bond having a functionality of 2. Preferred molecules to crosslink the polyester resin are vinyl, divinylbenzene, styrene, methyl, methacrylate, allylic terminated phtalates, cyanurates and others. Vinylmonomers may be present from 35 to 65 weight %.

Preferably, the unsaturated polyester compound has an equivalent weight in the range of about 400 to about 5 6000 g/mol. More preferably the equivalent weight is between 1000 and 4800 g/mol. The preferred minimum amount of double bonds is 5 to 10 mol double bonds/mol resin. The amount of present double bonds largely determines the stiffness of the cured material and therefore no maximum amount double bonds present per mol is defined in order to freely tailor the thermophysical characteristics of the foam: objected usage temperature, mechanical stiffness, elasticity of the foam, etc.

According to the present invention, a combination of unsaturated polyester resins and oligomeric reactive molecules is used as chemical backbone. As illustrated in FIG. 1, specific resins can be created by the radical reaction of oligomers containing reactive double bonds at the chain ends. In order to get the right foam properties, a mixture of oligomers and monomers is needed. Acrylates are a family of polymers, which are a type of vinyl polymer. Acrylates are made from acrylates monomers, which are esters containing a vinyl group that is two carbon atoms, double-bonded to each other, directly attached to the carbonyl carbon.

Monomers are used as reactive diluents in formulations. For this, often low cost, multipurpose products are used, because sometimes quite high levels of monomers are used in the formulations, especially to lower the viscosity. The influence of the monomer on the performance properties of the system can be significant.

In choosing the right monomers and/or oligomers, some parameters need to be taken into account, such as functionality, the type of chemical backbone, the chemical structure (cyclic, branched or linear) and the molecular weight. Performance characteristics such as reactivity (froth or cure rate), adhesion to various substrates and physical properties are also important. Further the foam needs to be applicable within a temperature range from −15° C. up to +35° C. The resin comprises preferably 50 to 90 weight percentage of the total weight (wt %), more preferably between 70 and 80 wt %. The oligomers used in the present invention preferably have unsaturated backbones with reactive groups and different functionalities i.e. they are monofunctional, difunctional, trifunctional, multifunctional or mixtures of several types and different molecular weight. In practice, the functionality varies between one and six.

Monofunctional oligomers are used to improve adhesion to difficult substrates and to improve flexibility. These products are of low viscosity. Various mixture of unsaturated polyesters and acrylates oligomers were chosen. Generally, the lower the functionality, the lower the reactivity, the better the flexibility and the lower the viscosity. An optimal combination of these properties is desired.

The oligomer is preferably selected from mono-, di- or trifunctional acrylates, methacrylate esters, epoxyacrylate esters, epoxyacrylates, urethane acrylate esters and melamine acrylate mono- and oligomers. More preferably, the oligomer is a di- or trifunctional urethane acrylate or methacrylate ester. Blends of any of the foregoing are possible. The oligomeric resin may comprise both tetra- and hexafunctional molecules with varying chemical composition of the backbone, which results in an optimal toughness and resilience.

The production of modified aliphatic & aromatic urethane acrylate oligomers consists of utilizing oligomers containing acrylates reactive end groups, with different functionalities or even mixtures of different oligomers with different functionalities. The chemistry of aliphatic & aromatic urethane acrylates is very versatile and different types are available. The parameters to vary can be functionality, type of isocyanate, type of polyol modifier and the molecular weight.

In the group of isocyanates, preferably diisocyanates such as HDI, IPDI and MDI are used. An additional criteria for the choice of the oligomer is cost. Optimizing the production cost by selection of the aliphatic diisocyanates according to the desired functionalities is important.

According to a preferred embodiment, the type of polyol modifier is the backbone of the urethane acrylates. According to the present invention, they are based on vegetable polyols. Because castor oil is available in large amounts of unsaturation and hydroxyl functional groups, this is a preferred vegetable source of polyols. The polyol varies in functionality and molecular weight. The molecular weight and functionality of the polyol has a big influence on reactivity, viscosity and flexibility. The molecular weight of the polyol modifier used will mostly determine the properties of the foam.

In a preferred embodiment, beside the unsaturated polyester or urethane and the acrylates backbone and monomers, other additives are needed to control the froth and curing process. A range of rheology modifiers, plastisicers, flame retardants, intitiators, crosslinkers, blowing agents, surfactants, tackifiers and other additives are used in certain mixing ratios in order to complete ecological friendly, fast curing foams with suited mechanical characteristics.

According to the present invention, the materials need to be designed towards the specifications needed for the foams, while they crosslink themselves into a resin. The unsaturated polyester or urethane having endcapped (meth)acrylates is designed so it has a cure rate of maximum 3 hours. Preferably, it is maximum 1 hour and more preferably, curing occurs within 30 minutes. Mixtures of several types of oligomers can be used.

An optimal curing rate for the PU foam results in a fast chemical curing and in a higher expansion ratio. This makes the foams suitable for spray-on applications and for filling holes and cavities. A high expansion ratio further results in a quick, consistent foam flow and fast curing time. Moreover, the curing kinetics of a combination of unsaturated polyesters and oligomers is much faster compared to the slow curing behavior (curing up to 24 hours) of PU foams produced without such oligomers. A cure rate of maximum 3 hours, preferably, maximum 1 hour and more preferably, maximum 30 minutes results in a wider range of possible applications of these newly designed foams.

The present invention focuses on the creation of one and two component foams with unsaturated polyester resins and oligomeric reactive molecules as chemical backbone. A main advantage of this kind of chemistry is the use of unsaturated backbones with reactive groups and different functionalities. By incorporation of an oligomeric acrylic resin comprising di-, tri-, or polyfunctional endcapped acrylates or methacrylates, the generally toxic and harmful diisocyanates groups in the backbone of the prepolymer are blocked. The new formulation urethane acrylate foam is soft, yet resistant, is flexible and resilient and has a great cell structure and the adhesion on paper is also good.

The curing of the unsaturated polyester resin and the acrylates oligomers is performed via a free radical mechanism in the presence of a monomer capable of crosslinking the polyester and acrylates. To initiate the reaction, a source of free radicals is needed. Preferably, the reaction will be initiated by tertiaire amines at low temperatures. The radical chain polymerization route consists of the crosslinkage of the double bonds of the unsaturated polyester resin, the urethane acrylates and the monomer.

To perform the crosslinking, an initiator can be mixed with the UP resin. Preferably peroxide initiators like benzoyl peroxide, methyl ethyl ketone peroxide, Cumene peroxide and Lauryl peroxide and others are used. Each different type of intitiator has its specific processing temperature and possible accelerator. For example, benzoyl peroxide (BPO) initiates crosslinking between 0 and 25° C., which is an acceptable temperature range for the intended use of the UP system. The initiator is preferably added to the resin in an amount between 0.01 to 10% by weight of the total mixture, more preferably between 3 and 8 wt %.

The activity of the initiator is augmented by activators which, via a redox reaction, favour the disintegration of the peroxide bond. For example, BPO is activated by tertiary amines like dimethyl aniline, diethyl aniline, and some commercial products like Bisomer PTE. Another suited initiator and activator system is the combination methyl ether ketone peroxide/Cobalt Octoate (MEKP/CoOctoate) which has a processing temperature of 20-25° C. Activators such as tertiary amines and organometallic catalysts may be present at about 0.0001 to 10 weight percent of the reaction mixture, preferably between 1 and 5 wt %.

Preferably, a blowing agent is to be added to the UP and oligomer resins to create an aerosol system, which allows spraying of the system into a curing froth, resulting in stable foam. Several blowing agents, typical liquefied petroleum gases like butane, propane, isobutane, dimethylether, isobutene and halogenated compounds can be used. These gases have some typical characteristics such as the amount of dissolution of the resins in the liquid phase, boiling temperature and vapour pressure in the can in order to create an ideal mixture for the foam formulation. The amounts with which the foaming agents may be used in the formulation differ from 2 to 40 wt %. Preferably, the concentration of blowing agent differs between 8 and 20 wt %.

Several other additives may be used to improve specific properties of the final foam, such as flame-retardants, surface agents, emulsifiers, plasticizers, extenders, thickeners, colorants, foam processing additives and catalysts. These compounds are added in a concentration between 0.01 to 10% by weight of the total mixture, more preferably between 1 and 8 wt %.

Flame retardancy of the obtained froth can be a requirement; in that case liquid fillers such as tris-dichloropropylphosphate (TCPP), or liquid or liquefied halogen-free flame-retardants, such as red phosphorous, ammonium polyphosphate (APP) may be used. Liquid extenders may be added to the mixture to control the flow of the froth while curing as well as to control the thermal and mechanistic characteristics of the cured system. Liquid extenders such as both saturated and/or unsaturated methyl esters of biodiesels may be used. Different introduced unsaturated biodiesel esters may have a different influence on the thermomechanistic behaviour of the cured foam, and in this way, tailor-made foams with numerous different possible applications may be obtained. Both flame retardants as liquid extenders are mixed in a part by weight ratio of 1 to 40 versus the unsaturated polyester resin, preferably with a mixing ratio of 5 to 20.

In two component foams, the initiator, together with some other additives is mixed with the resin formulation with a static mixer during spraying. The fast curing of the system then occurs when sprayed. In a one component system, the initiator should be present in the UP resin formulation. Reaction is however prevented by micro-encapsulation of the initiator. The initiator may be encapsulated in glass spheres, microspheres obtained via low boiling solvents or microspheres obtained from emulsion polymerization and/or sol gel polymerization. Upon spraying, the micro-capsules are broken, and the initiator is mixed within the UP resin, causing fast curing to occur after spraying in the same manner as for the two component formulations.

The resin comprises preferably 50 to 90 weight percentage of the total weight (wt %), more preferably between 70 and 80 wt %, the initiator is blended with 1 to 10 solid parts per 100 parts resin or matrix. The catalyst content may also be between 1 and 10 parts per 100 parts resin or matrix. Other additives may be blended with different amounts needed for optimal foam formulation. Blowing gases are blended with 2 to 30 wt % and preferably with 5 to 20 wt %. The reaction temperature may vary, depending on resin/initiator/catalyst system from 25° C. up to 150° C.

In one component foam, the active initiator is contained with a microencapsulated state. All products are then contained in one can. Upon application of the two component foam, both the mixture containing the curing resin and the initiator mixture are blended during spraying. For a two component system, the initiator must be kept away from the resin and the activator, which activates the initiator via a redoxreaction. In can A, a mixture of UP resin, the initiator, blowing agent and some other additives is made. In can B, the other part of the UP resin, the activator, blowing agent and some other additives is prepared. Mixing is proceeded for example during spraying by a static blender at the tip of the spraying gun or any other way to mix both systems upon application.

In the given example, the resin, activator, half of the emulsifier and blowing gas are stored in can A; initiator, flame retardant, silicone, the other half of emulsifier and blowing gas are stored in can B. Can A may contain 2 to 10 times the volume of can B.

EXAMPLE 1

One and Two Component Foams

| Component | Mixing ratio | Examples |
|---|---|---|
| Unsaturated polyester resin/vinyl monomers Acrylic oligomer resin Mixture | 100.00 pbw | To be obtained from Cray Valley™, Dow Chemicals™, Sartomer™ and others |
| Initiator | 4 pbw | Benzoyl Peroxide |
| Activator | 2.00 pbw | Bisomer PTETM |

-continued

| Component | Mixing ratio | Examples |
|---|---|---|
| Liquid filler/flame retardant | 10.00 pbw | Chlorinated paraffin, TCPP, TEP |
| Liquid (reactive) filler | 20.00 pbw | Castor oil methyl ester |
| Thickener | 2 pbw | Aerosil 200 |
|  | 2 pbw | BYK ® R605 |
| Surfactant | 8.00 pbw | Tegostab ™ B8870 |
| LPG | 5 weight % 1 | Propane/Butane/Isobutane |
| DME | 10.00 weight % 1 | Dimethylether |

1 Calculated weight % for the complete mixture

All amounts in above table may vary giving the ambient temperature, humidity, type of applicator (adapter, gun), application, etc.

A person skilled in the art will understand that the examples described above are merely illustrative in accordance with the present invention and not limiting the intended scope of the invention. Other applications of the present invention may also be considered.

The invention claimed is:

1. A pressurized can containing a polymer foam composition for use in one component and two component foams, said polymer foam composition having a cure rate of maximum 3 hours and comprising:
   an unsaturated resin present in a concentration of 50 to 90% by weight based on the total composition, and
   a reactive oligomeric acrylic resin comprising oligomers containing two, three, or more acrylic end groups, said oligomers being prepared by the following steps:
   (a) preparing a diisocyanate-terminated prepolymer by reacting diisocyanates with oligomers made of a backbone comprising two, three, or more hydroxyl groups; and
   (b) reacting the obtained diisocyanate-terminated prepolymer with an acrylate or methacrylate to end-cap the reacted diisocyanate and yield said reactive oligomeric acrylic resin,
   such that the obtained reactive oligomeric acrylic resin comprises oligomers made of a backbone and two, three, or more reacted disocyanates, each coupled to said backbone by a first urethane bond, wherein at least two of said reacted diisocyanates are further coupled to an acrylic group by a second urethane bond, creating the end-capping acrylic groups.

2. A pressurized can according to claim 1, whereby the composition has a cure rate of maximum 1 hour.

3. A pressurized can according to claim 2, whereby the composition has a cure rate of maximum 30 minutes.

4. A pressurized can according to claim 1, wherein the oligomeric acrylic resin comprises oligomers having an unsaturated backbone and/or comprise mixtures of oligomers of several types and different molecular weight.

5. A pressurized can according to claim 1 wherein the unsaturated resin is an unsaturated polyester and/or unsaturated urethane resin.

6. A pressurized can according to claim 1, comprising compounds selected from the group consisting of an activator, a surface agent, a blowing agent, a flame retardant, a plasticizer, an extender, a catalyst, an emulsifier, an initiator, foam processing additives, a colorant and/or a thickener or mixtures thereof.

7. A pressurized can according to claim 6, wherein the blowing agent is a mixture of liquefied petroleum gases selected from the group consisting of propane, butane, isobutene and dimethylether, wherein the blowing agent is added to the resin at a concentration of 2 to 40% by weight of the total mixture.

8. A pressurized can according to claim 1, characterized in that said composition is formulated as a one component foam for use in an aerosol can.

9. A pressurized can according to claim 1, wherein said composition is formulated as a two component foam for use in an aerosol can.

10. A pressurized can according to claim 6, comprising an initiator contained in microcapsules, wherein the microcapsules are glass spheres or microspheres obtained via low boiling solvents, sol gel polymerization and/or emulsion polymerization.

11. A pressurized can according to claim 6, wherein the blowing agent is a mixture of liquefied petroleum gases selected form the group consisting of propane, butane, isobutene, and dimethylether, wherein the blowing agent is added to the resin at a concentration of 0.01 to 10% by weight of the total mixture.

12. A pressurized can according to claim 1, wherein the oligomeric acrylic resin further comprises oligomers containing a single acrylic end group.

\* \* \* \* \*